United States Patent
Pakusch et al.

(10) Patent No.: US 6,653,372 B1
(45) Date of Patent: Nov. 25, 2003

(54) PREPARATION OF ADDITION-POLYMER POWDER

(75) Inventors: Joachim Pakusch, Ludwigshafen (DE); Joachim Roser, Mannheim (DE); Maximilian Angel, Schifferstadt (DE); Andree Dragon, Speyer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 873 days.

(21) Appl. No.: 08/868,736

(22) Filed: Jun. 4, 1997

(30) Foreign Application Priority Data

Jun. 12, 1996 (DE) .......................... 19623412

(51) Int. Cl.⁷ .................. C04B 26/04; C08L 29/04
(52) U.S. Cl. ............... 524/4; 524/3; 524/5; 525/57; 525/58; 523/342
(58) Field of Search ............ 523/342; 524/3, 524/4, 5; 525/57; 528/58

(56) References Cited

U.S. PATENT DOCUMENTS

| 5,118,751 A | * | 6/1992 | Schulze | 525/57 |
| 5,192,366 A | * | 3/1993 | Nishioka | 524/4 |
| 5,225,478 A | | 7/1993 | Beckerie et al. | |
| 5,462,978 A | * | 10/1995 | Penzel | 525/212 |
| 5,519,084 A | * | 5/1996 | Pak-Harvey | 525/57 |
| 5,567,759 A | | 10/1996 | Taniguchi et al. | |

FOREIGN PATENT DOCUMENTS

| DE | 2 049 114 | 4/1972 |
| DE | 22 38 903 | 2/1974 |
| DE | 24 45 813 | 4/1976 |
| DE | 33 42 242 | 4/1984 |
| DE | 41 18 007 | 12/1992 |
| DE | 42 06 429 | 9/1993 |
| DE | 33 44 242 | 6/1995 |
| DE | 44 06 822 | 9/1995 |
| DE | 195 06 331 A1 | 8/1996 |
| DE | 19 539 460 | 4/1997 |
| EP | 0 062 106 | 10/1982 |
| EP | 0 078 449 | 5/1983 |
| EP | 0 262 326 | 4/1988 |
| EP | 0 407 889 | 1/1991 |
| EP | 0 467 103 | 1/1992 |
| EP | 0 477 900 | 4/1992 |
| EP | 0 493 168 | 7/1992 |
| EP | 0 536 597 | 4/1993 |
| EP | 0 576 844 | 1/1994 |
| EP | 0 601 518 | 6/1994 |
| EP | 0 627 450 | 12/1994 |
| EP | 0 629 650 | 12/1994 |
| EP | 0 632 096 A1 | 1/1995 |
| EP | 0 632 096 | 1/1995 |
| EP | 0 671 435 | 9/1995 |
| EP | 0 680 993 | 11/1995 |

OTHER PUBLICATIONS

J. Schulze, TIZ–Fachberichte, vol. 109, No. 9, pp. 698–703, 1985, "Redeispersonspulver Im Zement".
U. Rietz, FH–Texte FH AaIan, vol. 53, pp. 85–107, 1987, "Dispersionspulver, Herstetlung Und Verwendung".

* cited by examiner

Primary Examiner—David J. Buttner
(74) Attorney, Agent, or Firm—Oblon, Spivak, McClelland, Maier & Neustadt, P.C.

(57) ABSTRACT

A process for preparing an addition-polymer powder suitable for modifying a binding mineral building material by drying an aqueous addition-polymer dispersion whose film has a glass transition temperature $Tg \leq 30°$ C. and to which a drying assistant has been added comprises adding to the aqueous addition-polymer dispersion before drying only a drying assistant which will have a plasticizing or deplasticizing effect in the ready-to-use mix of the binding mineral building material with water and admixing the resulting dry addition-polymer powder with at least one assistant in the form of a finely divided solid which will have an opposite effect to the drying assistant added before drying.

26 Claims, No Drawings

PREPARATION OF ADDITION-POLYMER POWDER

The present invention relates to a novel process for preparing an addition-polymer powder by drying an aqueous addition-polymer dispersion whose film has a glass transition temperature $Tg \leq 30°$ C. and to which a drying assistant has been added. (Film in the sense of the film formed by the aqueous addition-polymer dispersion when dried at 10° C. above the minimum filming temperature (DIN 53 787, 1974) but not below 20° C.)

The present invention furthermore relates to the addition-polymer powder obtained from the novel process and to its use for modifying binding mineral building materials.

Binding mineral building materials are generally known. The term applies to formulations comprising, as essential constituents, pulverulent inorganic binders such as lime, cement and/or gypsum, typically together with aggregates comprising sands, gravels, crushed rocks or other fillers such as, for example, natural or synthetic fibers and which, by mixing with water, are converted into their ready-to-use form (mortar or concrete), which, left alone, will harden to a rocklike state over time in air or in some cases even under water.

It is further generally known that, to control their mechanical property profile in the hardened rocklike state, binding mineral building materials are frequently used modified with finely divided addition polymers (as used herein, addition polymer shall encompass such high molecular weight compounds as are obtainable by free-radical polymerization of starting monomers containing at least one ethylenically unsaturated group).

The modifying effect of the finely divided addition polymer is frequently determined less by its chemical nature in many cases than by its physical properties, especially its glass transition temperature.

Addition polymers suitable for use as modifiers therefore can have very different monomer compositions and a glass transition temperature Tg (herein to be understood as the quasi-static glass transition temperature of DIN 53 765 (differential scanning calorimetry, 20° C./min, midpoint)) which can vary within a wide range, for example from −60 to +180° C. Examples of the modification of binding mineral building materials with addition polymers include for example U.S. Pat. No. 4,340,510, GB-B 1 505 558, U.S. Pat. Nos. 3,196,122, 3,043,790, 3,239,479, DE-A 4 317 035, DE-A 43 17 036, DE-A 43 20 220, EP-A 537 411, DE-B 16 69 903, BE-A 84 54 499, JP-A 54/43285, U.S. Pat. No. 4,225,496, DE-A 32 20 384, DE-A 28 37 898, U.S. Pat. No. 3,232,899 and JP-A 91/131 533.

These finely divided modifying addition polymers are usually incorporated in the form of their aqueous dispersions. These are systems of essentially spherical coils of intertwined polymer chains dispersed in an aqueous medium. The diameter of the polymer coil particles is generally mainly within the range from 10 0.01 to 5 μm, for example mainly within the range from 0.01 to 1 μm. The advantages of the aforementioned procedure therefore include the fact, on the one hand, that the addition polymer is present in the aqueous dispersion in a particularly finely divided form and that, on the other, the mixing water required is already present as dispersing medium.

However, the disadvantage of an aqueous addition-polymer dispersion as a use form is that it is not fully satisfactory as a shipment form. For instance, its transportation to the site of use will always include the transportation of the universally readily available (mixing) water as well as the transportation of the modifying polymer; secondly, it can only be added to the binding mineral building material at the site of use, since the binding mineral building material would otherwise harden before use.

The most convenient form of using an aqueous addition-polymer dispersion under the aforementioned aspects is therefore that of an addition polymer which is redispersible on addition of water (cf. for example DE-A 42 06 429). Together with the other mortar, concrete or render constituents, the redispersible polymer can be used to manufacture storable dry mixtures which are convenient to ship and which merely need to be mixed with water to convert them into the ready-to-use form.

In principle, addition polymers which redisperse on addition of water are obtainable by drying their aqueous dispersions, and they are normally obtained in powder form. Examples of such drying processes are freeze drying and spray drying. The latter method, which involves spraying the addition-polymer dispersion into a hot air stream to dewater it, is especially convenient for producing large quantities of powder. The drying air and the spray-dispensed dispersion are preferably passed cocurrently through the dryer (cf. for example EP-A 262 326 or EP-A 407 889).

Whereas the drying of addition-polymer solutions is normally fully reversible, one disadvantage of addition-polymer powders created by drying aqueous addition-polymer dispersions is that the redispersibility of the addition-polymer powders in water is generally not fully satisfactory in that the polymer particles resulting from the redispersing usually do not achieve the state of subdivision of the aqueous starting dispersion (primary particle diameter distribution), which reduces their modifying effect on addition to binding mineral building materials.

This is because, unlike solutions, the aqueous dispersions of addition polymers do not form thermodynamically stable systems. On the contrary, the system is trying all the time to reduce the area of interface between addition polymer and dispersing medium by combining small primary particles into larger secondary particles (eg. globules, coagulum), which can be prohibited for a prolonged period for the disperse state in the aqueous medium by adding dispersants.

In general, dispersants are substances capable of stabilizing the interface between the dispersed polymer and the aqueous dispersing medium. The stabilizing effect is primarily due to a steric and/or electrostatic screening of the dispersed polymer particles, the envelope around which is formed by the dispersant.

However, if aqueous addition-polymer dispersions are to be dried, then, the separating effect of the dispersants is frequently no longer adequate and irreversible secondary particle formation will occur to a certain extent; that is, the secondary particles remain as such on redispersion and reduce the modifying effect of the aqueous addition polymer obtainable by redispersion. This applies all the more the lower the glass transition temperature of the dispersed addition polymer is.

It is well known, then, that there are substances whose addition to aqueous addition-polymer dispersions reduces the appearance of irreversible secondary particle formation in the drying process.

These substances are generically known as drying assistants, In many cases they are known in particular for use as spraying assistants, since spray drying promotes the formation of irreversible secondary particles to a particular degree. At the same time, they generally reduce the formation of polymer deposits on the spray dryer wall and thus raise the yield of powder. Based on dispersed polymer, the drying assistants are normally added in amounts of from 1 to 30% by weight, frequently from 1 to 20% by weight.

Low addition quantities are frequently desirable.

According to TIZ-Fachberichte, 109 (1985), No. 9, 698, the drying assistants used hitherto are generally water-soluble substances which, in the course of the drying operation, form a matrix in which the water-insoluble, dispersant-enveloped primary addition-polymer particles are embedded. The surrounding matrix protects the primary addition-polymer particles from irreversible secondary particle formation. The usual outcome is a reversible formation of secondary particles (agglomerates typically from 1 to 250 µm in size), comprising numerous primary addition-polymer particles separated from one another by the drying assistant matrix. On redispersion in water, the matrix redissolves and the original, dispersant-enveloped primary polymer particles are essentially recovered. The reversibly formed secondary particles frequently have added to them finely divided antiblocking agents such as finely divided quartz powder, which act as spacers and, for example, counteract their caking together in the course of storage under the pressure of their own weight, which antiblocking agent addition can take place before, during and/or after the drying.

DE-A 20 49 114 recommends adding drying assistants comprising condensation products of melaminesulfonic acid and formaldehyde to aqueous addition-polymer dispersions, DE-A 24 45 813 and EP-A 78 449 recommend adding drying assistants comprising condensation products of naphthalenesulfonic acid and formaldehyde (especially their water-soluble alkali and/or alkaline earth metal salts) to aqueous addition-polymer dispersions, EP-A 407 889 recommends adding drying assistants comprising condensation products of phenolsulfonic acid and formaldehyde (especially their water-soluble alkaline and/or alkaline earth salts) to aqueous addition-polymer dispersions, DE-B 22 38 903 and EP-A 576 844 recommend the use of poly-N-vinylpyrrolidone as such a drying assistant, EP-A 62 106 and EP-A 601 518 recommend the use of polyvinyl alcohol as drying assistant. Polyvinyl alcohol is also recommended for the use as drying assistant by U. Rietz in Chemie und Technologie makro-molekularer Stoff (FH Texte FH Aachen) 53 (1987), 85, and in EP-A 680 993 and EP-A 627 450. DE-A 3 344 242 mentions ligninsulfonates as drying assistants.

DE-A 19 539 460, EP-A 671 435 and EP-A 629 650 disclose homo- and copolymers of 2-acrylamido-2-methylpropanesulfonic acid as suitable drying assistants for aqueous addition-polymer dispersions.

EP-A 467 103 relates to the preparation of addition-polymer powders which are redispersible in aqueous medium, by drying in the presence of copolymers of from 50 to 80 mol % of an olefinically unsaturated mono- and/or dicarboxylic acid and from 20 to 50 mol % of a $C_3$–$C_{12}$-alkene and/or styrene as drying assistants. DE-A 24 45 813 recommends sulfonyl-containing condensation products of mono- or polycyclic aromatic hydrocarbons and formaldehyde as drying assistants. DE-A 44 06 822 recommends graft polymers of polyalkylene oxides and unsaturated mono-/dicarboxylic acids or anhydrides derivatized with primary/secondary amines or alcohols as drying assistants. DE-A 33 44 242 and EP-A 536 597 mention starches and starch derivatives as suitable drying assistants. DE-A 493 168 recommends organopolysiloxanes as drying assistants. DE-A 33 42 242 mentions further cellulose derivatives as suitable drying assistants and DE-A 41 18 007 recommends condensation products of sulfonated phenols, urea, further organic nitrogen bases and formaldehyde as drying assistants.

Whereas the presence of the limited amount of drying assistant generally does not carry through to the mechanical properties of the hardened binding mineral building material modified with a redispersible addition-polymer powder and thus normally does not impair the modifying effect of the redispersed addition polymer in the hardened binding mineral building material, this does not apply to the flow behavior of the ready-to-use form in water of a binding mineral building material which has been modified with a redispersible addition-polymer powder (whereas the actual modifying addition polymer has typically. less of an effect on the aforementioned flow behavior).

The reason is, inter alia, that the drying assistants usually have a certain surface-active effect which, for example, significantly influences the wetting of the cement and aggregate particles in the binding mineral building material by the mixing water and hence the flow behavior.

Our experimental investigations coupled with literature studies have now revealed that the diversity of the known drying assistants can be split into essentially two groups, of which the presence of the members of the one group will lower the yield value of the ready-to-use form of the binding mineral building material modified with a redispersible addition-polymer powder (the members of this group will hereinafter be referred to as plasticizers), whereas a corresponding presence of the members of the other group will raise this yield value (the members of this group will hereinafter be referred to as deplasticizers).

The yield value is for the purposes of the present invention that shear stress above which a material behaves like a fluid, ie. flows, but below which it behaves like a solid, ie. does not flow.

In many cases, then, it is desirable that the ready-to-use form of the binding mineral building material modified with a redispersible polymer powder have a very low yield value (which could always be achieved by adding more water) without the aggregates separating out during hardening, so that the hardened polymer-modified binding mineral building material have a very homogeneous structure (not guaranteed in the case of plasticization by increased addition of water). Examples of such a requirements profile are self-leveling screeds based on polymer-modified binding mineral building materials (screeds are applied to uneven floors to obtain a smooth surface and should under the action of the shear stresses in particular due to the unevenness of the substrate flow like a fluid, so that a level surface is obtained automatically) or polymer-modified mineral mortar which should be pumpable for convenience. In these cases, the aqueous addition-polymer dispersion will of course have a plasticizing drying assistant added to it to prepare the modifying redispersible addition-polymer powder.

In other cases, it is desirable that the ready-to-use form of the polymer-modified binding mineral building material have a raised yield value. An example of such a requirements profile is a polymer-modified flow-resistant repair mortar. In the ready-to-use state it should be workable, but immediately after application to the usually vertically disposed repair site it should not flow under the shear stress of its own weight, ie. show flow resistance. In such a case, the aqueous addition-polymer dispersion will of course have a deplasticizing drying assistant added to it for producing the modifying redispersible addition-polymer powder.

DE-A 680 993 discloses in relation to aqueously redispersible addition-polymer powders produced from their aqueous addition-polymer dispersion by spray drying in the exclusive presence of deplasticizing polyvinyl alcohol as a spraying assistant that it can be advantageous for their use for modifying binding material building materials for the redispersible addition-polymer powder to include more polyvinyl alcohol than is necessary to ensure its redispersibility. For such a case, EP-A 680 993 recommends that the desired excess of polyvinyl alcohol be added to the redispersible addition-polymer powder only after completion of the spray drying, as a pulverulent pure substance.

However, it is also frequently desired that the yield value of the ready-to-use form of the polymer-modified binding mineral building material should vary somewhere between the two above-described extremes, in conformity with the particular problem setting.

In these cases it is obvious to admix the aqueous addition-polymer dispersion for producing the modifying redispersible addition-polymer powder with a drying assistant comprising a mixture of a plasticizing and a deplasticizing drying assistant.

Such a procedure is recommended for example in EP-A 477 900, in DE-A 24 45 813 and EP-A 632 096 as generally preferable to a procedure where one of the two drying assistant types is not mixed in until after the aqueous addition-polymer dispersion has been dried, when it is mixed in to the resulting redispersible addition-polymer powder in the form of a finely divided solid.

Our investigations on aqueous addition-polymer dispersions whose films had a $Tg \leq 30°$ C. led to the opposite result. It was in fact found that the two drying assistants did not in general complement but neutralize each other to a certain extent, which becomes increasingly noticeable as a disadvantage as the glass transition temperature of the film of the aqueous addition-polymer dispersion to be dried decreases in that the resulting addition-polymer powder contains an increased proportion of irreversible secondary particles.

The present invention accordingly provides a process for preparing an addition-polymer powder suitable for modifying a binding mineral building material by drying an aqueous addition-polymer dispersion whose film has a glass transition temperature $Tg \leq 30°$ C. and to which a drying assistant has been added, which comprises adding to the aqueous addition-polymer dispersion before drying only a drying assistant which will have a plasticizing effect in the ready-to-use mix of the binding mineral building material with water and admixing the resulting dry addition-polymer powder with at least one assistant which will have a deplasticizing effect in the ready-to-use mix of the binding mineral building material with water and is in the form of a finely divided solid.

The present invention further provides a process for preparing an addition-polymer powder suitable for modifying a binding mineral building material by drying an aqueous addition-polymer dispersion whose film has a glass transition temperature $Tg \leq 30°$ C. and to which a drying assistant has been added, which comprises adding to the aqueous addition-polymer dispersion before drying only a drying assistant which will have a deplasticizing effect in the ready-to-use mix of the binding mineral building material with water and admixing the resulting dry addition-polymer powder with at least one assistant which will have a plasticizing effect in the ready-to-use mix of the binding mineral building material with water and is in the form of a finely divided solid.

Whether a drying assistant would have a plasticizing or deplasticizing effect in the ready-to-use mix of the binding mineral building material with water can be determined in simple preliminary experiments. For this, the binding mineral building material is made up with and without drying assistant (while the ratio of mixing water to binding mineral building material is kept constant) and the yield value is determined in each case.

Examples of drying assistants which have a plasticizing effect in ready-to-use forms of cementitious binding mineral building materials with water (drying assistant A) are in particular polymers and oligomers containing at least one type of the following functional groups: sulfo, sulfonato (conjugated base of sulfonic acid), carboxyl and carboxylato (conjugated base of carboxylic acid). These drying assistants include the condensates of formaldehyde with naphthalenesulfonic acid, melaminesulfonic acid and/or phenolsulfonic acid and also the water-soluble salts of these condensates, especially the alkali metal salts (eg. Na, K), alkaline earth metal salts (eg. Mg, Ca), and ammonium salts, as described for example in EP-A 78 449, DE-A 20 49 114, EP-A 407 889, DE-A 24 45 813 and DE-A 41 18 007. This group of drying assistants also includes the ligninsulfonates of DE-A 33 44 242 and also the homo- and copolymers of active monomers such as 2-acrylamido-2-methylpropanesulfonic acid and also the water-soluble salts of these homo- and copolymers, especially the alkali metal salts (Na, K), alkaline earth metal salts (eg. Mg, Ca) and ammonium salts, as disclosed for example in DE-A 19 539 460, EP-A 671 435 and in EP-A 629 650.

This group of drying assistants also includes the homo- and copolymers of active monomers such as acrylic acid, methacrylic acid and/or maleic acid and also the water-soluble salts of these homo- and copolymers, especially the alkali metal salts (eg. Na, K), alkaline earth metal salts (eg. Mg, Ca) and ammonium salts, as disclosed, for example in EP-A 467 103. Drying assistants with a plasticizing effect in cementitious compositions also include the graft polymers of polyalkylene oxides and unsaturated mono/dicarboxylic acids and anhydrides after derivatization with primary/secondary amines or alcohols as recommended for example by DE-A 44 06 822, and also the starches and starch derivatives of DE-A 33 44 242 and EP-A 536 597. Examples of drying assistants with a deplasticizing effect in ready-to-use forms of cementitious binding mineral building materials with water (drying assistants B) include for example the homo- and copolymers of vinyl alcohol as recommended for example by EP-A 62 106, EP-A 680 993, EP-A 627 540 and EP-A 601 518, the homo- and copolymers of N-vinylpyrrolidone as disclosed for example by EP-A 576 844 and DE-B 22 38 903, and the cationic N-vinylpyrrolidone copolymers of DE-A 19 540 305. In addition, the organopolysiloxanes of EP-A 493 168 and the cellulose derivatives of DE-A 33 44 242 are suitable for use as deplasticizing drying assistants.

The present invention thus also provides in particular a process for preparing an addition-polymer powder suitable for modifying cementitious binding mineral building materials by drying an aqueous addition-polymer dispersion whose film has a glass transition temperature $Tg \leq 30°$ C. and to which a drying assistant has been added, which comprises adding to the aqueous addition-polymer dispersion before drying just drying assistant A and admixing the resulting dry addition-polymer powder with at least one drying assistant B in the form of a finely divided solid.

The present invention accordingly further provides in particular a process for preparing an addition-polymer powder suitable for modifying cementitious binding mineral building materials by drying an aqueous addition-polymer dispersion whose film has a glass transition temperature $Tg \leq 30°$ C. and to which a drying assistant has been added, which comprises adding to the aqueous addition-polymer dispersion before drying just drying assistant B and admixing the resulting dry addition-polymer powder with at least one drying assistant in the form of a finely divided solid.

A drying agent B which is particularly suitable for this invention is partially and completely hydrolyzed polyvinyl acetate (vinyl acetate-vinyl alcohol copolymer). The degree of hydrolysis is advantageously from 70 to 100 mol % (which corresponds to an ester number of from 0 to about 270 (mg of KOH/g of polymer); that is the amount of potassium hydroxide in mg which would be required to hydrolyze the unhydrolyzed vinyl acetate still remaining in 1 g of polymer). The degree of hydrolysis is advantageously within the range from 80 to 95 mol % (which corresponds to an ester number of from about 90 to about 190 (mg of KOH/g of polymer). The molecular weight of the hydrolyzed polyvinyl acetate is suitably such for example that the polymer have a number average monomer unit content of from 100 to 5000, preferably from 200 to 1000. This applies in particular when drying assistant B is added according to this invention on completion of the drying of the aqueous addition-polymer dispersion. In this case, the particle size of the hydrolyzed polyvinyl acetate is advantageously such that 95% by weight have a largest particle diameter $\leq 250$ μm, preferably $\leq 200$ μm. Normally 95% by weight of the hydrolyzed polyvinyl acetate have a largest particle diameter $\geq 1$ μm.

Drying assistants A particularly suitable for this invention are the sulfo-containing condensation products of EP-A 78 449 and DE-A 24 45 813, of which the naphthalenesulfonic acid-formaldehyde condensates are preferred in turn. This applies in particular when drying assistant A is added, as the sole drying assistant, to the aqueous addition-polymer dispersion before it is dried. Particularly suitable deplasticizing assistants to be added in this case after the drying has ended are (in the case of cementitious compositions to be modified) the aforementioned hydrolyzed polyvinyl acetates.

The above applies in particular when the process of this invention is applied to aqueous addition-polymer dispersions whose films each have a glass transition temperature $Tg \leq 25°$ C., or $\leq 20°$ C., or $\leq 15°$ C., $\leq 10°$ C., or $\leq 5°$ C., or $\leq 0°$ C. Frequently, the glass transition temperature of the film of the aqueous addition-polymer dispersion to which the process of this invention can be applied with advantage is $\geq -65°$ C. or $\geq -50$C. or $\geq -30°$ C., respectively. The process of this invention is particularly suitable for the relevant addition-polymer powder production starting from aqueous addition-polymer dispersion having a $T_g$ value of from $-20°$ C. to $+20°$ C., of from $-15°$ C. to $+15°$ C. for their films.

So the process of this invention is suitable for the drying of aqueous addition-polymer dispersions whose dispersed addition polymer is polymerized from monomers having at least one ethylenically unsaturated group, such as olefins, eg. ethylene, aromatic vinyl monomers such as styrene, α-methylstyrene, o-chlorostyrene, or vinyltoluenes, vinyl and vinylidene halides such as vinyl and vinylidene chloride, esters of vinyl alcohol and monocarboxylic acids having from 1 to 18 carbon atoms, such as vinyl acetate, vinyl propionate, vinyl n-butyrate, vinyl laurate and vinyl stearate, and also commercially available monomers VEOVA®09-11 (VEOVA X is a trade name of Shell and represents vinyl esters of carboxylic acids which are also designated Versatic® X-acids), esters of allyl alcohol and monocarboxylic acids having from 1 to 18 carbon atoms, such as allyl acetate, allyl propionate, allyl n-butyrate, allyl laurate and allyl stearate, esters of α,β-monoethylenically unsaturated mono- and dicarboxylic acids having preferably from 3 to 6 carbon atoms, in particular acrylic acid, methacrylic acid, maleic acid and fumaric acid, and itaconic acid, with alkanols having in general from 1 to 12, preferably from 1 to 8, in particular from 1 to 4, carbon atoms, such as in particular methyl acrylate, ethyl acrylate, n-butyl acrylate, isobutyl acrylate, 2-ethylhexyl acrylate, methyl methacrylate, ethyl methacrylate, n-butyl methacrylate, isobutyl methacrylate, 2-ethylhexyl methacrylate, dimethyl maleate or di-n-butyl maleate, nitriles of α,β-monoethylenically unsaturated carboxylic acids, such as acrylonitrile, and also $C_{4-8}$-conjugated dienes such as 1,3-butadiene and isoprene. The monomers mentioned generally form the principal monomers which, based on the total amount of polymerized monomers, normally account for a share of more than 50% by weight, Monomers which customarily polymerize to homopolymers having an increased water solubility are normally merely included as modifying monomers in amounts, based on the total amount of the monomers to be polymerized, of less than 50% by weight, generally from 0.5 to 20, preferably from 1 to 10,% by weight.

Examples of such monomers are α,β-monoethylenically unsaturated mono- and dicarboxylic acids having from 3 to 6 carbon atoms and their amides, for example acrylic acid, methacrylic acid, maleic acid, fumaric acid, itaconic acid, acrylamide and methacrylamide, also vinylsulfonic acid and its water-soluble salts and also N-vinylpyrrolidone. Monomers which customarily increase the internal strength of the films of the aqueous addition-polymer dispersions are generally likewise included only in minor amounts, usually from 0.5 to 10% by weight, based on the total amount of the monomers to be polymerized. Such monomers normally have an epoxy, hydroxyl, N-methylol, carbonyl or at least two unconjugated ethylenically unsaturated double bonds. Examples thereof are N-alkylolamides of α,β-monoethylenically unsaturated carboxylic acids having from 3 to 10 carbon atoms and their esters with alcohols having from 1 to 4 carbon atoms, of which N-methylol-acrylamide and N-methylolmethacrylamide are very particularly preferred, monomers having two vinyl radicals, monomers having two vinylidene radicals and also monomers having two alkenyl radicals. Particularly suitable here are the diesters of divalent alcohols with α,β-monoethylenically unsaturated monocarboxylic acids, of which acrylic acid and methacrylic acid are preferred in turn. Examples of such monomers having two unconjugated ethylenically unsaturated double bonds are alkylene glycol diacrylates and dimethacrylates such as ethylene glycol diacrylate, 1,3-butylene glycol diacrylate, 1,4-butylene glycol diacrylate and also propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate and triallyl cyanurate, Also of particular importance in this connection are the $C_1$–$C_8$-hydroxyalkyl methacrylates and acrylates such as n-hydroxyethyl acrylate, n-hydroxyethyl methacrylate, n-hydroxypropyl acrylate, n-hydroxypropyl methacrylate, n-hydroxybutyl acrylate and n-hydroxybutyl methacrylate and also compounds such as diacetoneacrylamide and acetylacetoxyethyl acrylate or methacrylate. As well as monomers with unsaturated double bonds, minor amounts, customarily from 0.01 to 2% by weight, based on the monomers to be polymerized, may be included of molecular weight regulators such as tert-dodecyl mercaptan or 3-mercaptopropyltrimethoxysilane.

So the process of this invention is suitable inter alia for drying aqueous addition-polymer dispersions whose dispersed addition polymer is free-radically polymerized from from 70 to 100% by weight of esters of acrylic acid and/or methacrylic acid with alkanols having from 1 to 12 carbon atoms, or from 70 to 100% by weight of styrene and esters of acrylic acid and/or methacrylic acid with alkanols having from 1 to 12 carbon atoms, or from 70 to 100% by weight of butadiene or from styrene and butadiene, or from 40 to 100% by weight of ethylene and vinyl acetate or ethylene and vinyl propionate or of ethylene and vinyl acetate and vinyl propionate.

The process of this invention is particularly applicable in the case of aqueous addition-polymer dispersions PD to be dried whose dispersed polymer is free-radically polymerized A) from 80 to 100% by weight of at least one monomer selected from the group consisting of styrene, α-methylstyrene, vinyltoluenes, esters between α,β-monoethylenically unsaturated carboxylic acids having from 3 to 6 carbon atoms and alkanols having from 1 to 12 carbon atoms, butadiene and also vinyl and allyl esters of alkanecarboxylic acids having from 1 to 12 carbon atoms, and B) from 0 to 20% by weight of other monomers having at least one ethylenically unsaturated group.

Examples of possible monomers A are n-butyl acrylate, 2-ethylhexyl acrylate, methyl methacrylate and styrene.

Possible monomers B are acrylamide, methacrylamide, acrylic acid, acrylonitrile, methacrylonitrile, 2-acrylamido-2-methylpropanesulfonic acid, vinylpyrrolidone, hydroxyethyl acrylate, hydroxymethyl acrylate, hydroxypropyl acrylate, hydroxypropyl methacrylate, quaternized vinylimidazole, N,N-dialkylaminoalkyl (meth)acrylates, N,N-dialkylaminoalkyl (meth)acrylamides, trialkylammonioalkyl (meth)acrylates and trialkylammonioalkyl (meth)acrylamides.

The desired glass transition temperature can be set using the Fox relationship. According to Fox (T. G. Fox, Bull. Am. Phys. Soc. (Ser. II) 1, 123 [1956] and Ullmanns Encyklopädie der technischen Chemie, Vol 19, 4th edition, Verlag Chemie, Weinheim (1980), pages 17 and 18), the glass transition temperature of copolymers is given to a good approximation by $$\frac{1}{T_g} = \frac{x^1}{T_g^1} + \frac{x^2}{T_g^2} + \cdots \frac{x^n}{T_g^n},$$

where $x^1, x^2, \ldots x^n$ are the mass fraction $1, 2, \ldots n$ and $T_g^1, T_g^2, \ldots T_g^n$ are the glass transition temperatures, in degrees kelvin, of the respective homopolymers of the monomers 1, 2, . . . n. The glass transition temperature $T_g$ of these homopolymers of the aforementioned monomers are known and are given for example in J. Brandrup, E. H. Immergut, Polymer Handbook $1^{st}$ Ed., J. Wiley, New York 1966, $2^{nd}$ Ed., J. Wiley, New York, 1975 and $3^{rd}$ Ed., J. Wiley, New York 1989 and in Ullmann's Encyclopedia of Industrial Chemistry, VCH, Weinheim, Vol. A21 (1992), p. 169.

Suitable protective colloids and/or emulsifiers for stabilizing the dispersion include for example all those which are mentioned in DE-A 42 13 965. The same applies to the polymerization initiators. The solids volume concentration of the aqueous addition-polymer dispersion to be dried will generally be from 10 to 75, frequently from 20 to 65, usually from 30 to 50, % by volume, based on the volume of the aqueous addition-polymer dispersion, in the context of the process of this invention.

Of course, the drying assistants which according to this invention are to be added to the aqueous addition-polymer dispersion before it is dried can also have been added even before and/or during the preparation by the method of free-radical aqueous emulsion polymerization, in which case they generally also have a stabilizing effect on the disperse state of the addition-polymer particles.

In general, the amount of drying assistant to be added according to this invention to the aqueous addition-polymer dispersion before it is dried is from 0.1 to 30, frequently 1 or from 5 to 15, % by weight, based on the amount of dispersed addition polymer. The amount of plasticizing or deplasticizing assistant to be added after the drying has ended (incorporation is advantageously effected in a suitable mixer for solids, for example in a vibrator, roll mill or screw mixer) is correspondingly typically within the range from 0.1 to 30 or 15, frequently 0.5 or from 1 to 10 or up to 5, % by weight, based on the amount of addition-polymer powder. The above applies in particular when the drying assistant added before the drying step is a sulfo-containing condensation product of formaldehyde and the drying assistant added after the drying step is a hydrolyzed polyvinyl acetate. This in turn is in particular when the aqueous addition-polymer dispersion to be dried is an addition-polymer dispersion PD.

The weight average diameter of the addition-polymer particles in a disperse state in the aqueous addition-polymer dispersion to be dried according to this invention is normally $\geq 250$ nm to $\leq 2000$ nm, frequently $\geq 250$ nm to $\leq 1500$ nm, often $\geq 250$ to $\leq 1000$ nm.

In general, the drying according to this invention is effected by spray drying the aqueous addition-polymer dispersion at an air inlet temperature $T_E$ of from 100 to 200° C., preferably of from 120 to 160° C., and an air outlet temperature $T_A$ of from 30 to 90° C., preferably from 50 to 90° C. The spray drying customarily takes place in a drying tower. The spraying of the aqueous addition-polymer dispersion into the hot air stream can be effected for example by means of single- or multi-material nozzles or via a rotating disk. The collection of the addition-polymer powder is normally effected using cyclones or filter separators. The spray-dispensed aqueous addition-polymer dispersion and the hot air stream preferably move in parallel. Frequently, a finely divided mineral antiblocking agent (eg. finely divided silica gel), is metered into the tower during the spray drying, especially to suppress any clumping together of the spray-dried secondary addition-polymer particles during prolonged storage of the addition-polymer powder obtained according to this invention. According to JP-A 7/53728, the addition of such an inorganic antiblocking agent can also take place into the aqueous addition-polymer dispersion prior to its spray drying. It may be put on record here that the finely divided solid assistant to be added to the resulting addition-polymer powder within the procedure of this invention after the drying has ended generally likewise has an antiblocking effect, which constitutes a second advantageous aspect of the procedure of this invention.

However, the principal advantage of the procedure of this invention is that it provides—without diminution of the redispersibility—addition-polymer powders whose use for modifying binding mineral building materials makes it possible to set any desired yield value for their ready-to-use mixes with water in a specific manner. What is surprising in this context is that the plasticizing or deplasticizing effect of the assistant added according to this invention after the drying has ended is more pronounced than if added prior to the drying, which can of course also be effected by the method of freeze drying.

The addition-polymer powders obtainable according to this invention are especially suitable for modifying binding mineral building materials whose mineral binders comprise from 70 to 100% by weight of cement and from 0 to 30% by weight of gypsum in each case. This is particularly true when cement is the sole mineral binder. The effect of this invention is essentially independent of the type of cement. Depending on the building project, it is thus possible to use blast furnace cement, oil slate cement, Portland cement, hydrophobicized Portland cement, quick setting cement, high expansion cement or high alumina cement, although the use of Portland cement has proved particularly advantageous.

The dry compositions of binding mineral building materials typically comprise from 0.1 to 20% by weight of modifying addition-polymer powder, based on the amount of mineral binder comprised.

The addition-polymer powders obtainable according to this invention are useful for example for modifying cementitious repair or reinforcing mortars.

A common method of thermal insulation comprises for example applying Styropor insulant boards to house facades. Usually, the back of the Styropor insulant board is secured to the facade (eg. masonry, concrete, mineral render, etc.) by means of polymer-modified cementitious mortar. The same mortar is generally applied to the front of the Styropor insulant boards as well, as a reinforcing mortar. A reinforcing mortar normally serves to embed fabric reinforcements (composed for example of glass fibers, polyester, polypropylene and the like), which are generally used for joint bridging between individual Styropor boards and which are intended to prevent the formation of shrinkage and movement cracks in the cementitious base coating to be applied at the Styropor board butt joints and edges. Finally, further reinforcing mortar is customarily applied atop the mesh fabric to embed the fabric completely, the surface is leveled and, after this cementitious base coating has hardened through, a final coating, for example a mineral or synthetic resin render, is applied (cf. EP-A 698 586).

If, then, the reinforcing mortar used is a mortar modified with water-redispersible addition-polymer powders whose aqueous addition-polymer starting dispersions each have in the filmed state a Tg of from $\leq 30°$ C. to $-60°$ C., preferably within the range from $0°$ C. to $-50°$ C., then this reinforcing mortar will have, in the hardened state, increased elasticity and thus even crack bridging capability (cf. AT Patent 359904). This means that, if such a reinforcing mortar is used, the fabric reinforcement can be dispensed with and the cementitious base coating can be applied in one operation to the required layer thickness (in general from 3 to 30 mm, frequently from 5 to 20 mm).

However, the latter presupposes that the polymer-modified reinforcing mortar, especially if applied to a large area, should have the yield value appropriate to the particular site of application (overhead, vertical surfaces, inclined surfaces, etc.), which, on the one hand, prevents flowing (sagging) of the applied mortar under the action of its own weight, but, on the other, enables working by spraying or by hand to take place under the action of appropriate forces. According to this invention, this yield value can be set in a specific manner as required.

Frequently, the reinforcing mortar has added to it natural or synthetic fibers composed of materials such as, for example, Dralon (length for example from 1 to 10 mm, linear density for example from 3 to 10 dtex), which additionally enhances its crack bridging capability.

To further improve the workability properties of such reinforcing mortars, they frequently include cellulose derivatives and microsilicas. The former usually have a thickening action, while the latter normally form thixotroping agents which additionally reduce the flowability of the aqueous mortar before it sets in the placed stationary state. Calcium carbonate and quartz sand generally constitute the remaining aggregates. By adding defoamers (preferably in powder form from the dry mortar aspect), a suitable air pore content (5 to 20% by volume) can be achieved in the hardened state of the hardened cementitious reinforcing mortar.

The amount of modifying addition-polymer powder added to the cementitious reinforcing mortar will be from 9 to 20% by weight, based on cement content, for extremely high crack bridging requirements and from 4 to 9% by weight, based on cement content, for lesser crack bridging requirements. Only in the case of particularly low crack bridging requirements will the amount of modifying addition-polymer powder added be limited to the range from 0.1 to 4% by weight, based on cement content.

Of course, the modifying addition-polymer powder can also be obtained by drying of such aqueous addition-polymer dispersions as comprise additives enhancing the adhesion of their film to materials such as Styropor, as described for example in EP-A 698 586. Moreover, additives which reduce the glass transition temperature of the dispersed addition polymer can have been added prior to the drying. Preferably, however, no such additives are added; that is, the glass transition temperatures mentioned herein for the films of the addition-polymer dispersions preferably correspond essentially to the glass transition temperatures of the addition polymers dispersed therein. Typical reinforcing mortars in the form of a dry composition of a binding mineral building material comprise from 20 to 60, preferably from 20 to 50, % by weight of mineral binder (preferably cement only), from 0.1 to 20, frequently from 0.1 to 10, % by weight of modifying addition-polymer powder obtainable according to this invention, up to 25% by weight of conventional assistants (eg. defoamers or thickeners) and a remainder comprising aggregates such as, for example sand, fillers (eg. $CaCO_3$), pigments (eg. $TiO_2$), natural and/or synthetic fibers.

EXAMPLES a) Preparation of an Aqueous Addition-polymer Dispersion D1

In a polymerization vessel, a mixture of

| | |
|---|---|
| 150 g | of water, |
| 5.6 g | of a 20% strength by weight aqueous solution of ethoxylated p-isooctylphenol (EO degree: 25) = emulsifier solution 1, |
| 0.48 g | of a 35% strength by weight aqueous solution of the sodium salt of the sulfuric monoester of ethoxylated p-isooctylphenol (EO degree: 25) = emulsifier solution 2, |
| 3.4 g | of a 20% strength by weight aqueous polyacrylamide solution = protective colloid, |
| 1.7 g | of sodium dicarbonate and |
| 3.9 g | of a 10% strength by weight aqueous formic acid solution } pH buffer, | was heated to $90°$ C. To this mixture in the polymerization vessel were then continuously added, starting at the same time and while the $90°$ C. were maintained, 742.8 g of an aqueous monomer emulsion comprising

| | |
|---|---|
| 403.2 g | of n-butylacrylate, |
| 140.0 g | of styrene, |
| 11.2 g | of acrylamide, |
| 5.6 g | of methacrylamide, |
| 8.4 g | of emulsifier solution 1, |
| 11.5 g | of emulsifier solution 2, and |
| 162.9 g | of water, |
| over 2 h and also a solution of | |
| 3.3 g | of sodium peroxodisulfate (free-radical initiator) and |
| 90 g | of water | over 2.5 h. On completion of the addition the reaction mixture was additionally stirred at 90° C. for 120 min and then cooled down to 60° C.

To reduce the residual monomer content, the resulting aqueous addition-polymer dispersion was initially admixed with a solution of 1.1 g of tert-butyl hydroperoxide in 5.5 g of water, added all at once, and then, while the 60° C. were maintained, admixed over 1 h with a solution of 0.6 g of sodium formaldehydesulfoxylate in 15 g of water, added continuously, and on completion of the addition subsequently stirred at 60° C. for a further 30 min. 15 min after completion of the stirring the mixture was cooled down to 25° C. and, to increase the stability of the disperse distribution, the pH of the aqueous dispersing medium was raised to a value of 8.7 (by means of the addition of 3.5 g of a 10% strength by weight aqueous ammonia solution). Finally, the dispersion was filtered through a sieve having a mesh size of 250 µm.

The resulting aqueous addition-polymer dispersion D1 had a solids content of 55.3% by weight and a light transmissivity, relative to pure water, of 8% (2.5 cm cell length, dilution of the aqueous addition-polymer dispersion D1 to a solids content of 0.01% by weight). The glass transition temperature of the dispersed addition polymer is calculated to be 7° C. using the Fox relationship.

b) Drying Assistant T1:

T1 was the drying assistant of Example 4 of EP-B 78 449. It is the sodium salt of a naphthalenesulfonic acid-formaldehyde condensation product.

c) Drying Assistant T2:

Hydrolyzed polyvinyl acetate (=copolymer of polyvinyl alcohol and polyvinyl acetate) having a degree of hydrolysis of 87.7±1 mol %, an ester number of 140±10 mg of KOH/g of polymer and also a viscosity (determined by the method of DIN 53015 at 23° C.) of 4±0.5 mpa·s for its 4% strength by weight aqueous solution.

The largest particle diameter of 95% by weight of the hydrolyzed polyvinyl acetate was ≦200 µm and ≧1 µm.

d) Spray Drying of the Aqueous Addition-polymer Dispersion D1 to addition-polymer powders P1 to P5 and investigation of the redispersibility of these addition-polymer powders P1: First the aqueous addition-polymer dispersion D1 was diluted to a solids content of 40% by weight. Then a 20% strength by weight aqueous solution of drying assistant T1 was prepared. Into this aqueous solution a sufficient quantity of the aqueous addition-polymer dispersion which had been diluted to a solids content of 40% by weight was vigorously stirred until the total solids content of the resulting mixture was 35% by weight.

This 35% strength by weight aqueous mixture was spray dried in a Minor lab dryer from GEA Wiegand GmbH (Niro Division). DE, having two-material nozzle atomization (nozzle diameter 1.3 mm) using a tower inlet temperature of 130° C. and a tower outlet temperature of 60° C. (throughput: about 2 kg of spray feed/h). At the same time as the spray feed about 2.5% by weight (based on the solids content of the spray feed) of a finely divided silica (average largest particle diameter: 25 µm) were metered into the drying chamber as an antiblocking agent.

P2: As P1, buton completion of the spray drying 3% by weight, based on T2, of drying assistant P1 in a finely divided solid form were additionally mechanically incorporated (on an SM vibrator from Edmund Bühler Laborgeratebau, DE, Bodelshausen).

P3: As P2, but the subsequent incorporated amount of T2 was 5% by weight, again based on P1.

P4: As P1, but before the aqueous mixture was spray dried it was additionally admixed with 3% by weight, based on the solids content of the mixture, of drying assistant T2.

P5: As P4, but the amount of T2 added before the spray drying was 5% by weight, calculated on the same basis.

The redispersibility of the resulting addition-polymer powders was examined as follows:

A glass flask was charged with 90 g of water, followed at 25° C. by 10 g of addition-polymer powder. The mixture was stirred for 1 min at 9500 rpm using an Ultra-Turrax 1 from Janke & Kunkel, IDA-Labortechnik, Staufen DE, and transferred to a graduated cylinder. The graduated cylinder was then sealed with a plastic stopper and stored for 72 h at 25° C. without agitation. Thereafter the redispersion was thoroughly shaken and filtered through a 72 µm sieve. The sieve with the filter cake was stored at 80° C. in a drying cabinet for 12 h and then the percentage weight proportion of the dried coagulum, based on the amount of powder used (10 g), was determined by weighing. The results are shown below in Table 1.

TABLE 1

| Powder | Coagulum |
|---|---|
| P1 | 1.2% by weight |
| P2 | 1.2% by weight |
| P3 | 1.2% by weight |
| P4 | 3.1% by weight |
| P5 | 8.0% by weight |

The powders P4 and P5 have the worst redispersibility although their preparation involved the addition, prior to the spray drying, of drying assistant T2 in addition to the identical amount of drying assistant T1. By contrast, the addition to P1 according to the invention of assistant T2 after the spray drying does not affect the redispersibility of P1.

e) Use of the addition-polymer powders P1 to P5 for modifying reinforcing mortar and controlling the yield value thereof The following formulation was followed to prepare a ready-to-use mix of reinforcing mortar:

370 g of Omyacarb® 130 GU (white calcium carbonate from Omya GmbH, Cologne), 140 g of quartz sand (largest particle diameter from 0.1 to 0.6 mm), 430 g of Portland cement PZ 35F, 18 g of finely divided silica (microsilica from Elkem GmbH, Allensbach), 90 g of addition-polymer powder, 10 g of Lumiten® EP 3108 (defoamer from BASF AG), 2 g of Walocel® MT 20000 PV (methylhydroxyethylcellulose, with retarded solubility in neutral-pH cold water, thickener from Wolff Walsrode AG), 3 g of of Dralon fibers (white, semimatt, 4 mm in length, 6.7 dtex) and 195 g of water.

The ready-to-use mortar mix was applied by means of a trowel (stainless steel, 280 mm×130 mm) by hand to a 6 m² large, Styropor-boarded, vertical test wall in a layer thickness of 8 mm and smoothed flat. 24 h later the flow or flow resistance of the placed reinforcing mortar under its own weight was rated visually as follows:

1=very good flow resistance, no running;
2=good flow resistance, hardly any running;
3=satisfactory flow resistance, some running;
4=some sagging, considerable running;
5=pronounced sagging, sags with cracking;
6=mortar does not stay placed at all.

The results are found below in Table 2.

TABLE 2

| Powder | Rating |
|--------|--------|
| P1 | 6 |
| P2 | 1 |
| P3 | 1 |
| P4 | 6 |
| P5 | 3 |

The examples show that, if the hydrolyzed polyvinyl acetate is added before the spray drying, the plasticizing effect of the naphthalenesulfonic acid-formaldehyde condensate is only slightly is offset, compared with a subsequent addition of the hydrolyzed polyvinyl acetate. So, hydrolyzed polyvinyl acetate added after the spray drying has been carried out has a distinctly more deplasticizing effect.

We claim:

1. A process for preparing an addition-polymer powder suitable for modifying a binding mineral building material by drying an aqueous addition-polymer dispersion whose film has a glass transition temperature Tg≦30° C. and to which a drying assistant has been added, which comprises adding to the aqueous addition-polymer dispersion before drying only a drying assistant which has plasticizing effect in the ready-to-use mix of the binding mineral building material with water and admixing the resulting dry addition-polymer powder with at least one assistant which has a deplasticizing effect in the ready-to-use mix of the binding mineral building material with water and which assistant is in the form of a finely divided solid.

2. The process as claimed in claim 1, wherein the binding mineral building material comprises cement as a mineral binder.

3. The process as claimed in claim 1, wherein the plasticizing drying assistant is a polymer or oligomer or combination thereof containing at least one functional group selected from the group consisting of sulfo, sulfonate, carboxyl and carboxylate.

4. The process as claimed in claim 3, wherein the plasticizing polymer or oligomer or a combination thereof is at least one selected from the group consisting of condensates of formaldehyde with naphthalenesulfonic acid, melaminesulfonic acid and phenolsulfonic acid, the salt of these condensates, ligninsulfonates, homo- and copolymers of 2-acrylamide-2-methylpropanesulfonic acid, of acrylic acid, of methacrylic acid, and maleic acid and the salts of these homo- and copolymers.

5. The process as claimed in claim 2, wherein the deplasticizing assistant is a vinyl alcohol or N-vinylpyrrolidone homo- or copolymer, an organopolysiloxane and a cellulose derivative or combination thereof.

6. The process as claimed in claim 5, wherein the deplasticizing vinylalcohol homo- or copolymer is a hydrolyzed polyvinyl acetate having a degree of hydrolysis is from 70 to 100%.

7. The process as claimed in claim 6, wherein the hydrolyzed polyvinyl acetate has a number average monomer unit content of from 100 to 5000.

8. The process as claimed in claim 1, wherein the glass transition temperature of the film of the aqueous addition-polymer dispersion to be dried is >20° C.

9. The process as claimed in claim 8, wherein the glass transition temperature of the film of the aqueous addition-polymer dispersion to be dried is ≦10° C.

10. The process as claimed in claim 9, wherein the glass transition temperature of the film of the aqueous addition-polymer dispersion to be dried is ≦0° C.

11. The process as claimed in claim 1, wherein the dispersed addition polymer in the aqueous addition-polymer dispersion to be dried is free-radically polymerized from 70 to 100% by weight of esters of acrylic or methacrylic acid or a mixture thereof with alkanols having from 1 to 12 carbon atoms.

12. The process as claimed in claim 1, wherein the dispersed addition polymer in the aqueous addition-polymer dispersion to be dried is free-radically polymerized from 70 to 100% by weight of styrene and esters of acrylic or methacrylic acid or a mixture thereof with alkanols having from 1 to 12 carbon atoms.

13. The process as claimed in claim 1, wherein the dispersed addition polymer in the aqueous addition-polymer dispersion to be dried is free-radically polymerized from 70 to 100% by weight of butadiene or of styrene and butadiene.

14. The process as claimed in claim 1, wherein the dispersed addition polymer in the aqueous addition-polymer dispersion to be dried is free-radically polymerized from 40 to 100% by weight of ethylene and at least one of vinyl acetate and vinyl propionate.

15. The process as claimed in claim 1, wherein the dispersed addition polymer in the aqueous addition-polymer dispersion to be dried is free-radically polymerized from 80 to 100% by weight of monomers selected from the group consisting of styrene, α-methylstyrene, vinyltoluenes, esters between α,β-monoethylenically unsaturated carboxylic acids having from 3 to 6 carbon atoms and alkanols having from 1 to 12 carbon atoms, butadiene and also vinyl and allyl esters of alkanecarboxylic acids having from 1 to 12 carbon atoms, and from 0 to 20% by weight of other monomers having at least one ethylenically unsaturated group.

16. The process as claimed in claim 1, wherein the amount of drying assistant added before drying is from 0.1 to 30% by weight, based on the amount of dispersed addition polymer.

17. The process as claimed in claim 1, wherein the amount of assistant added as a finely divided solid after the drying is from 0.1 to 30% by weight based on the amount of dry addition-polymer powder.

18. The process as claimed in claim 1, wherein the weight-average diameter of the addition-polymer particles dispersed in the aqueous addition-polymer dispersion to be dried is from 250 to 2000 nm.

19. The process as claimed in claim 1, wherein the aqueous addition-polymer dispersion is dried by spray drying.

20. The process as claimed in claim 19, wherein the spray drying is carried out with an air inlet temperature $T_E$ of from 100 to 200° C. and an air exit temperature $T_A$ of from 30 to 90° C.

21. The process as claimed in claim 19, wherein a finely divided mineral antiblocking agent is metered in at at least one time selected from the group consisting of before, during and after the spray drying.

22. An addition-polymer powder obtained by the process as claimed in claim 1.

23. A binding mineral building material comprising an addition-polymer powder as claimed in claim 22.

24. A dry mortar, comprising:
  a) from 20 to 60% by weight of a mineral binder,
  b) from 0.1 to 20% by weight of an addition-polymer powder as claimed in claim 22, and
  c) up to 25% by weight of an additive, and a remainder comprising aggregates of sand, fillers, pigments, natural fibers or synthetic fibers or a combination thereof.

25. A method of modifying a binding mineral building material, which comprises adding the addition-polymer powder as claimed in claim 22 to a binding mineral building material for modifying said binding mineral building material.

26. The process as claimed in claim 7, wherein the hydrolyzed polyvinylacetate is added in the form of a finely divided solid 95% of whose weight have a largest particle diameter of $\leq 250$ µm.

* * * * *